United States Patent

[11] 3,528,330

| [72] | Inventor | David Ehlert<br>Lake Zurich, Illinois |
|---|---|---|
| [21] | Appl. No. | 770,021 |
| [22] | Filed | Oct. 23, 1968 |
| [45] | Patented | Sept. 15, 1970 |
| [73] | Assignee | Illinois Tool Works Inc.<br>Chicago, Illinois<br>a corporation of Delaware |

[54] APPARATUS FOR CONTINUOUSLY FORMING ARTICLES FROM SHEET MATERIAL STOCK
10 Claims, 6 Drawing Figs.

[52] U.S. Cl. ..................................................... 83/103, 83/154, 93/36
[51] Int. Cl. .............................................. B26d 7/18
[50] Field of Search ................................... 83/103, 154; 93/36A

[56] References Cited
UNITED STATES PATENTS

| 3,303,979 | 2/1967 | Lang | 83/103X |
| 3,404,607 | 10/1968 | Feick et al. | 83/103X |
| 3,435,737 | 4/1969 | Sarka | 93/36 |

Primary Examiner—William S. Lawson
Attorneys—Olson, Trexler, Wolters and Busnell, Robert W. Beart, Michael Kovac, Barry L. Clark and Jack R. Halvorsen ABSTRACT: There is disclosed an apparatus comprising rotary dies for continuously forming articles such as can carriers from a strip of sheet material. The dies are constructed for severing various pieces from the strip for providing the end product with the desired configuration. Cooperable knock-out elements are provided on rolls for gripping the severed pieces and insuring removal thereof from the strip.

Patented Sept. 15, 1970
3,528,330
Sheet 1 of 3
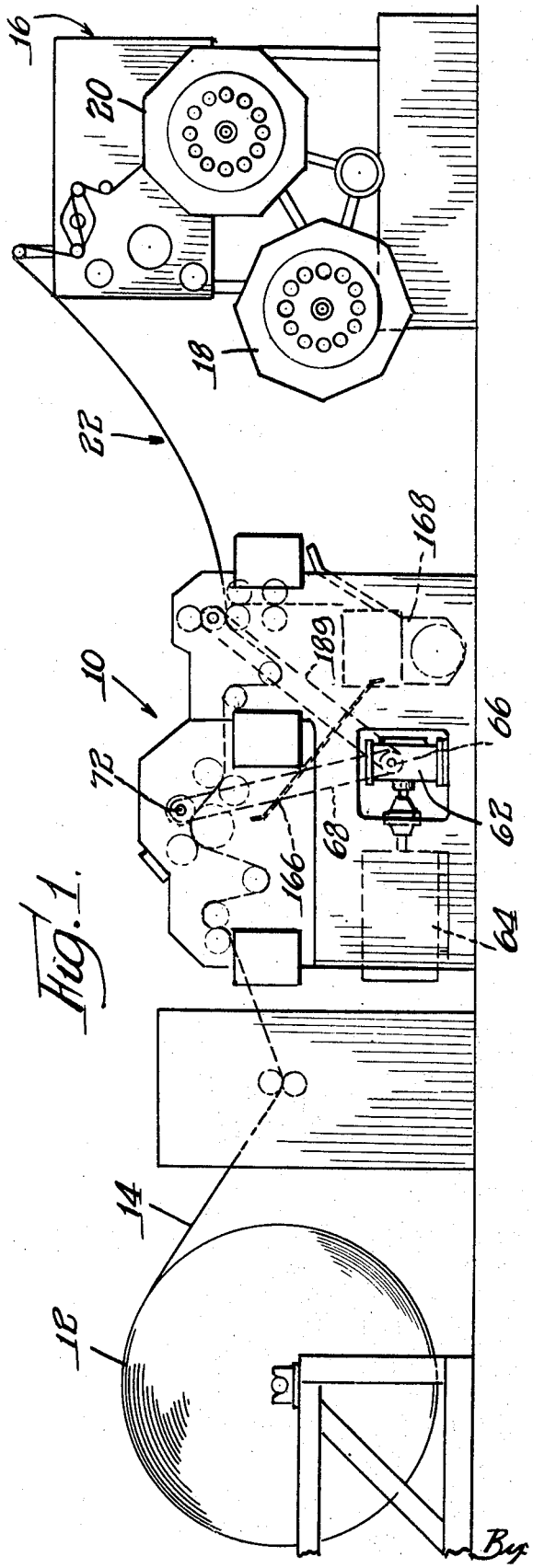
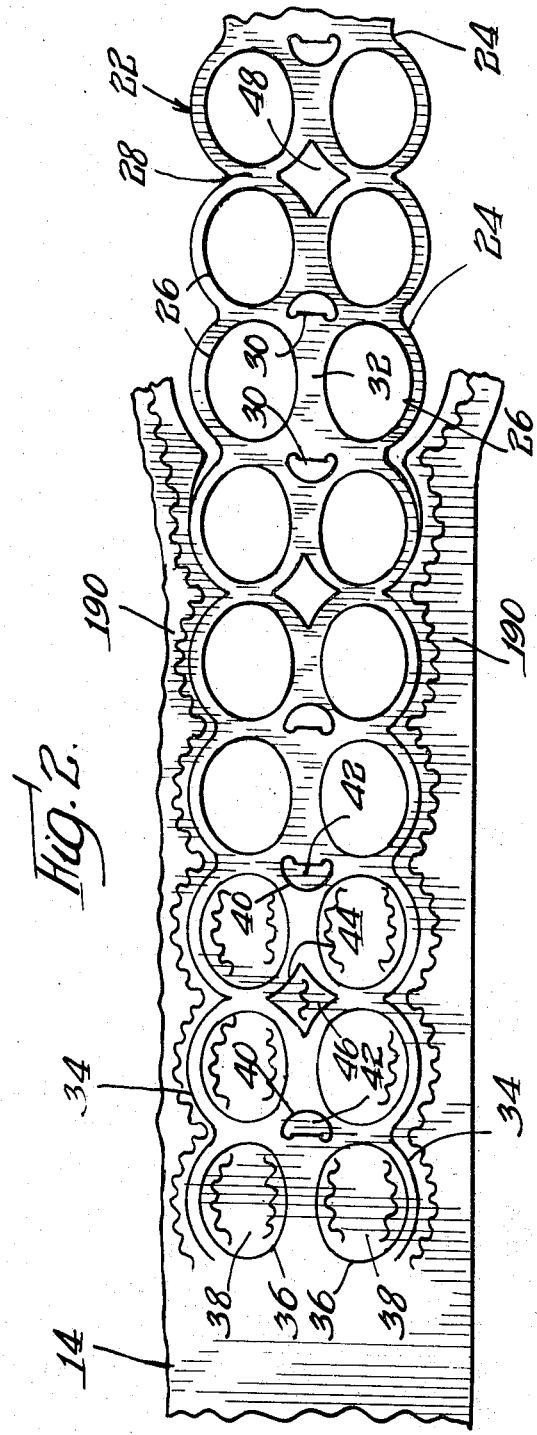
Inventor
David Elert
By Olson, Trexler, Wolters & Bushnell attys Inventor
David Ehlert
By: Olson, Trexler, Wolters & Bushnell attys

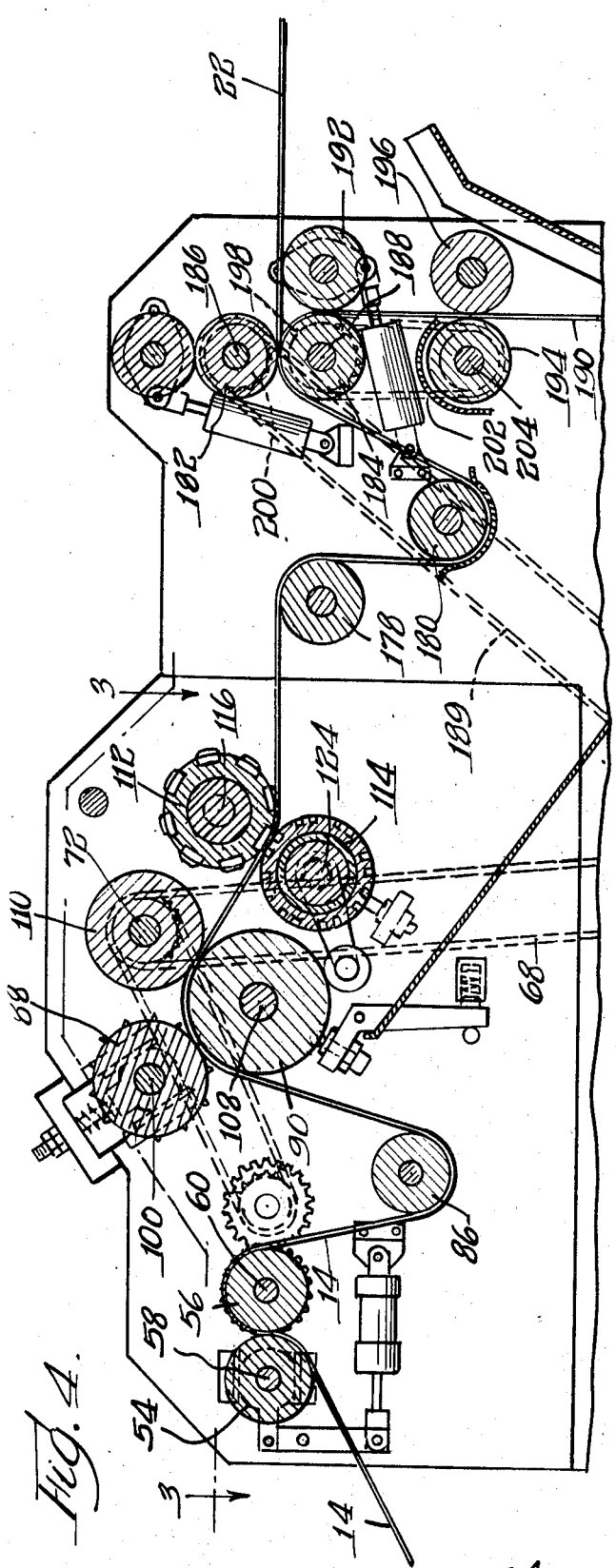
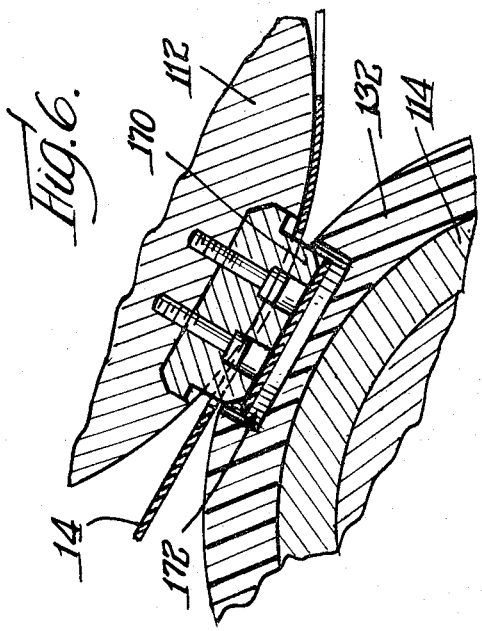
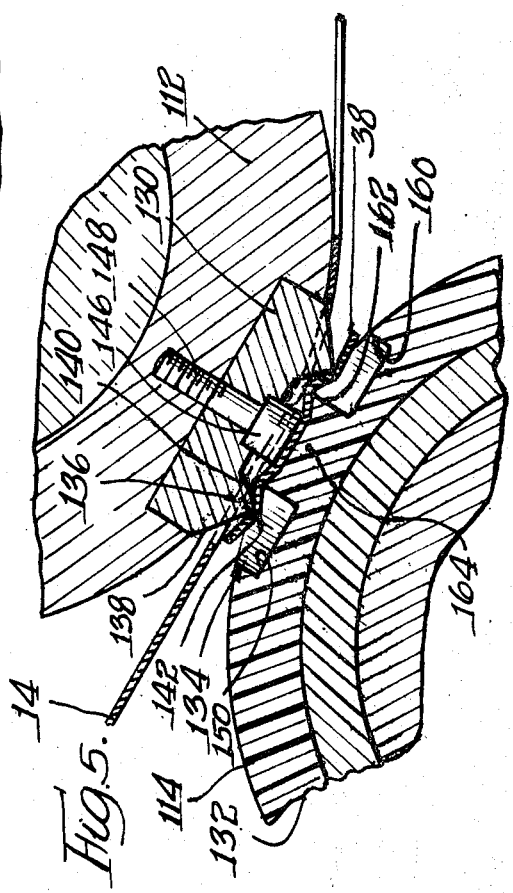

APPARATUS FOR CONTINUOUSLY FORMING ARTICLES FROM SHEET MATERIAL STOCK

The present invention relates to a novel apparatus for continuously forming articles from a strip of sheet material.

While it will become apparent that features of the present invention may be utilized in apparatus for forming a variety of different workpieces or articles, one embodiment which is specifically disclosed herein is adapted to form a strip of interconnected can carriers from plastic stock material. Such carriers comprise a generally flat body of plastic material having openings formed therein for receiving end portions of cans and the like and other openings which may be used as finger gripping holes.

It is an object of the present invention to provide a novel apparatus of the above described type capable of accurately and effectively forming workpieces such as can carriers from a strip of plastic or other suitable stock material.

A more specific object of the present invention is to provide an apparatus of the above described type having novel knock-out means for insuring complete removal of severed pieces or scrap from the finished article.

A still further specific object of the present invention is to provide a novel apparatus for continuously forming articles from a strip of plastic or other suitable stock material, which apparatus includes rotary die means for severing pieces from the stock material, and rotary knock-out means including a knock-out plug or punch and a cooperable element for positively gripping a severed piece and displacing such piece with respect to the stock material for insuring complete separation.

Other objects and advantages of the present invention will become apparent from the following description and the accompanying drawings wherein:

FIG. 1 is a side elevational view showing an apparatus incorporating features of the present invention;

FIG. 2 is an enlarged fragmentary plan view showing the condition of a length of stock material as it is progressively processed upon passage through the apparatus from a blank to a finished article such as a can carrier;

Figure 3:
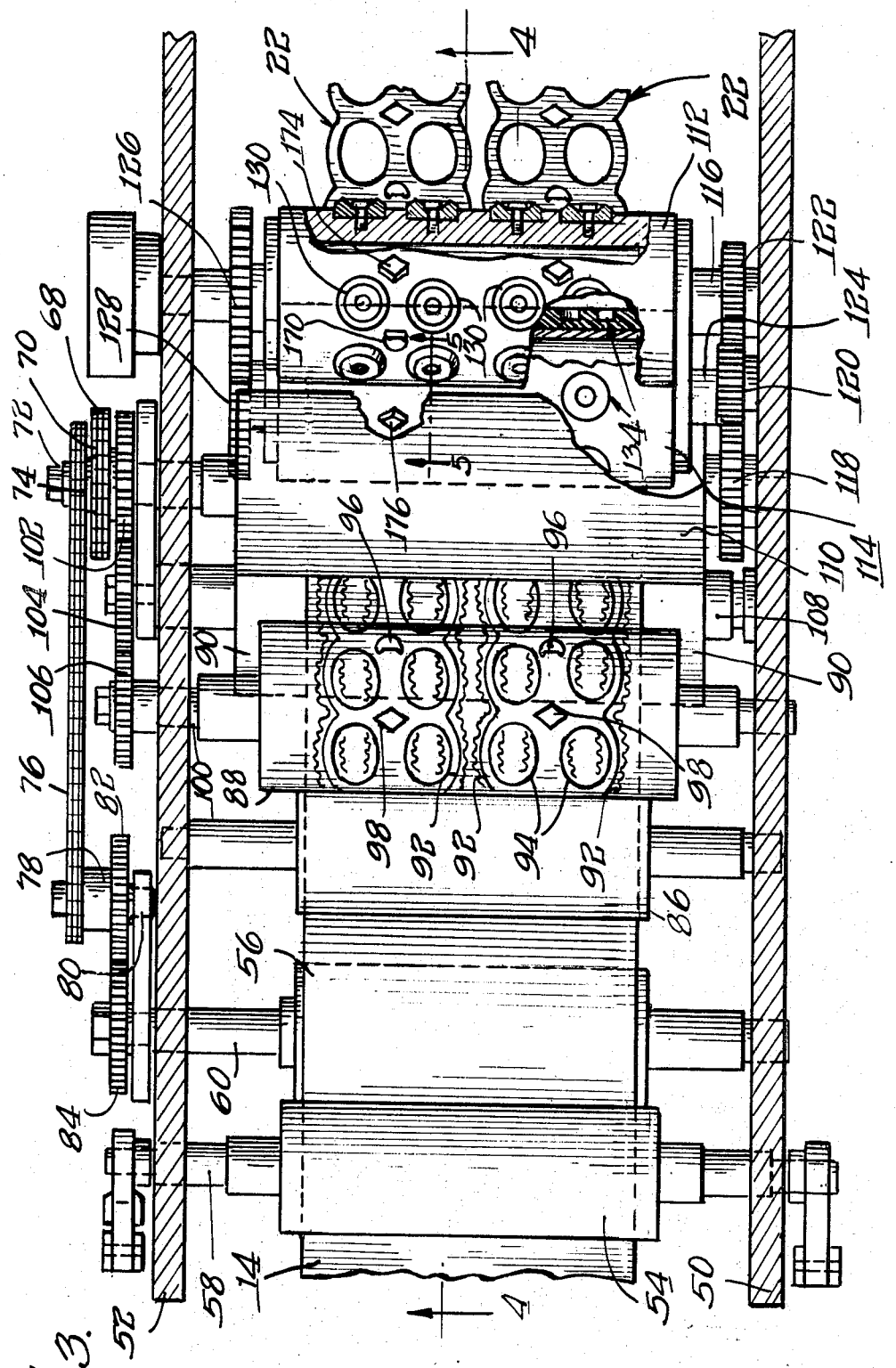
FIG. 3 is an enlarged partial sectional view taken generally along line 3—3 in FIG. 4.

FIG 4. is a partial sectional view taken generally along line 4—4 in FIG. 3;

FIG. 5 is an enlarged fragmentary sectional view taken generally along line 5—5 in FIG. 3 and showing a portion of knock-out roller means incorporated in the apparatus; and FIG. 6 is a fragmentary sectional view similar to FIG. 5, but showing another portion of the knock-out roller means.

Referring now more specifically to the drawings wherein like parts are designated by the same numerals throughout the various figures, an apparatus 10 incorporating features of the present invention is shown in FIG. 1 installed between a roll 12 of blank strip or stock material 14 and a windup reel supporting apparatus 16. The reel supporting apparatus forms no part of the present invention and thus it suffices to state that it is adapted to support reels 18 and 20 on which a continuous workpiece 22 may be wound as it is formed by the apparatus 10 from the strip 14 of stock material.

FIG. 2 shows the manner in which the stock material is transformed from a blank strip to the article 22 as it passes through the apparatus 10. In the particular embodiment shown, the finished article 22 comprises interconnected can carriers 24 of known construction. It suffices to state that each of the carriers comprises two rows of three can receiving pockets or apertures 26. Adjacent ends of the carriers are integrally joined at lines 28 and they are adapted to be separated from each other along these lines when ultimately assembled with cans so as to provide a "six pack". Finger holes 30 are formed in the carrier body between the rows of apertures 26 for enabling the package to be picked up.

As shown at the left-hand end of FIG. 2, the strip 14 is blank as it enters the apparatus 10. The strip is then passed through dies which will be described below and which function to cut the strip along lines 34 for defining opposite margins of the article 22. The dies also serve to cut the strip along circular lines 36 for defining pieces 38 which are removed as hereinafter described for producing the pockets or apertures 26.

The cutting dies are also provided with elements which form cuts along lines 40 defining pieces 42 which are removed to provide the finger openings. Additional cuts along lines 44 defining pieces 46 are made at intervals located at the connected ends of successive carriers 24. These pieces 46 are subsequently removed for providing the article with openings 48 between ends of adjacent interconnected carriers.

Referring now more specifically to FIGS. 1, 3 and 4, it is seen that the apparatus 10 comprises opposite side frame members 50 and 52. Feed rolls 54 and 56 are mounted on shafts 58 and 60 rotatably supported between the side frame members adjacent an entering end of the apparatus 10. The strip 14 enters the apparatus between the feed rolls. The shaft 60 of feed roll 56 is driven by a suitable means interconnected with an adjustable speed reducer unit 62 driven by a motor 64. The speed reducer unit may be of known construction and need not be described in detail. The unit 62 includes output sprocket means 66 indicated in FIG. 1 which drives a chain 68 encircling and driving another sprocket 70 on shaft 72. As indicated in FIGS. 3 and 4, this shaft carries a second sprocket 74 which drives a chain 76 encircling a sprocket 78 on shaft 80. The shaft 80 carries and drives a gear 82 which in turn drives a gear 84 on the feed roll shaft 60.

The strip 14 is directed from the feed roller 56 beneath a guide or idler roller 86 and then upwardly between a rotatable die or cutter roller 88 and a backup roller 90. The rotary die or cutter roller is provided with cutter or knife elements 92 for severing the strip along the lines 34 mentioned above and knife elements 94 for making the generally circular cuts 36. Additional cutter elements 96 and 98 are provided for making the finger opening cuts 40 and the cuts 44. In the embodiment shown in FIG. 3, the rotary die is provided with two sets of the aforementioned cutter elements so that it is adapted to process a strip 14 having a width sufficient to enable two of the elongated articles 22 to be formed in side-by-side relationship.

The cutter roller or die 88 is carried by shaft 100 which is driven from the shaft 72 through gears 102, 104, 106 as shown in FIG. 3. The backup roller 90 is rotatably supported on shaft 108.

The previously mentioned shaft 72 extends between the opposite side frame members and carries another roller 110 which bears against the backup roller 90 and may be used for scoring the strip of stock material as desired.

As the strip 14 passes from the roller 110 all of the desired scoring and cutting steps have been accomplished. The strip is then directed between cooperable rollers 112 and 114 carrying knock-out elements constructed in accordance with features of the present invention for insuring complete separation of scrap material from the finished article 22. The roller 112 is carried by shaft 116 driven in timed relationship with the shaft 72 by means of a gear 118 on the shaft 72, an idler gear 120 and a gear 122 on the shaft 116.

The cooperable knock-out roller 114 is supported on shaft 124 which is driven in timed relationship with the shaft 116 by meshing gears 126 and 128 respectively secured to these shafts.

Difficulties have been encountered in removing relatively large cutouts such as the pieces 38 from the strip, particularly when the strip is formed of a resilient somewhat slippery material, such as polyethylene. Upon the application of localized pressure to such a relatively large cutout, the material may tend to stretch and the piece may slip relative to the pressure applying element whereby the piece may not be properly removed from the strip. In accordance with a feature of the present invention, the knock-out rollers are provided with cooperable means for overcoming these problems.

As best shown in FIGS. 3 and 5, the knock-out roller 112 is provided with a plurality of punch elements 130 arranged to engage the pieces 38 to be removed from the strip. The roller 114 includes a cylindrical member 132 formed from a tough resilient plastic or rubber-like material and presenting elements 134 respectively cooperable with the punches 130.

In the embodiment shown, the die or punch member 130 is formed with an annular projecting lip 136 extending radially outwardly of the peripheral surface of the roller 112. The projection or lip 136 has a beveled outer side 138 joining an inclined inner wall 140 at a crest 142. The annular crest 142 has a configuration corresponding to the configuration of the cut line 36 defining a cutout piece 38 to be removed from the sheet except that it is smaller in diameter or transverse dimensions so that the crest is adapted to engage the cutout piece 38 within the cut line 36.

The inner wall 140 of the lip of projection 136 defines a recess 144 into which a center post 146 on the member 130 projects. In the embodiment shown, the center post comprises the head of a screw 148 which serves to secure the member 130 to the roll 112. The element 134 comprises an annular recess 150 formed in the member 132. This recess has the same general annular configuration as the lip or projection 136 and provides sufficient clearance to prevent the projection from interfering with the roll 114. The annular recess 150 is defined by an outer wall 160 and an inner wall 162. The inner wall in turn defines a center post 164 which projects radially sufficiently for interfering engagement with the center post 146 of the punch member 130. As previously indicated, the member 132 on the roll 114 is formed from a tough resilient material so that the center post 164 is adapted to yield slightly when engaged by the center post 146 as shown in FIG. 5.

The manner in which a cutout piece 38 is removed from the strip is clearly shown in FIG. 5. More specifically, as the strip advances between the rolls 112 and 114, a center portion of the piece 138 is securely clamped between the interfering center posts 146 and 164. Thus, the piece 38 is secured against slippage relative to the member 130. At the same time, the projecting lip portion 136 of the member 130 engages an annular portion of the piece 38 within the cut line 36 and deflects the piece 38 into the recess 150. Since the central part of the piece 38 is clamped between the center posts, the action of the projecting lip serves to deflect the engaged annular portion of the piece 38 out of the plane of the strip so that the peripheral edge of the piece 38 is pulled away from and positively separated from the strip 14 along the cut line 36. As the strip and the separated piece 38 emerge from between the rolls 112 and 114, the scrap material falls onto a chute 166 indicated in FIG. 1 and is discharged into a box or container 168 from which it may be removed by any suitable means.

The rolls 112 and 114 also carry cooperable elements for removing the cutout pieces 42 and 46 from the strip. Elements such as the previously described complementary punch and recess means 130 and 134 may be used except for modification as to size and shape. However, since the cutout pieces 42 and 46 are relatively small, the problem of stretching and slippage of the material is greatly reduced. Thus, simple punch elements 170 are secured to the roller 112 and cooperable elements 172 are formed in the roller member 132 for displacing the cutout pieces 42 as shown in FIGS. 3 and 6. Similar, but appropriately shaped cooperable punch and recess elements 174 and 176 are provided for removing the pieces 46.

The strip 14 emerging from between the knock-out rolls is directed around guide rolls 178 and 180 as shown best in FIG. 4. Then the strip passes between feed rolls 182 and 184 respectively carried by shafts 186 and 188. The shaft 186 is driven in timed relationship with the rotary cutting rolls and knock-out rolls by suitable means including a chain 189 extending from the speed reducing units 62.

As the strip emerges from between the rolls 182 and 184, the finished article portion 22 is directed toward one of the reels on the apparatus 16. As indicated in FIG. 2, opposite marginal portions 190 of the strip 14 are removed from the articles 22. This is accomplished by passing these opposite marginal portions or waste strips downwardly between the roller 184 and the cooperating roller 192 and then between feed rollers 194 and 196. Meshing gears 198 and 200 are on the roller shafts 186 and 188 for driving the roller 184 and a suitable drive chain 202 extends around sprocket means on the roller shaft 188 and additional sprocket means on a shaft 204 supporting the roller 194 for driving the roller 194.

While a preferred embodiment of the present invention has been shown and described herein, it is obvious that many structural changes may be made without departing from the spirit and scope of the appended claims.

I claim:

1. An apparatus for forming an article from a strip of sheet stock material comprising a first pair of cooperable rolls including means thereon for forming cuts in said strip passing therebetween and defining pieces to be removed from the strip, a second pair of cooperable rolls adjacent said first pair of rolls for removing said pieces from the strip passing therebetween, one of said second pair of rolls including punch means comprising a projection engageable with a piece to be removed and a first clamping element adjacent the projection, the other of said second pair of rolls including recess means providing clearance for said projection and into which the piece engaged by the projection is displaced and a second clamping element cooperable with the first clamping element for securing therebetween a piece being engaged by said projection, and a means for driving said rolls in timed relationship, whereby the pieces to be removed are secured from movement relative to the punch means while the projection separates the pieces from the material.

2. An apparatus, as defined in claim 1, wherein said clamping elements project radially of their respective rolls for interfering engagement with each other, one of said clamping elements being yieldable.

3. An apparatus, as defined in claim 1, wherein said means for forming cuts is substantially annular for forming annular cuts and defining pieces to be removed of predetermined dimensions, said projection having a substantially annular crest having dimensions smaller than said predetermined dimensions.

4. An apparatus, as defined in claim 3, wherein said first clamping element is disposed within said annular crest of the projection, said projection extending generally radially with respect to its associated roll outwardly of a terminal end of the first clamping element.

5. An apparatus, as defined in claim 3, wherein said means for forming annular cuts comprises a plurality of generally annular cutting elements arranged on one of said first pair of rolls in a predetermined pattern, and said rolls of the second pair respectively include a plurality of said punch means, recess means and clamping elements arranged in a pattern corresponding to said predetermined pattern.

6. An apparatus, as defined in claim 5, wherein said other roll includes a peripheral portion formed from tough resilient material, said recess means and said second clamping element being integral with said portion.

7. In an apparatus for removing pieces from a sheet of stock material, which pieces are substantially defined by cut lines of predetermined dimensions, first and second cooperable rolls between which the sheet material is adapted to pass, punch means on said first roll comprising a projection engageable with a piece to be removed and a first clamping element adjacent the projection and engageable with the piece, recess means in said second roll providing clearance for said projection and into which a piece engaged by the projection may be displaced, a second clamping element on said second roll and cooperable with said first clamping element for securing therebetween a piece being engaged by said projection whereby the pieces to be removed are secured from movement relative to the punch means while the projection separates the pieces from the sheet of stock material.

8. An apparatus, as defined in claim 7, wherein said projection is substantially annular and has dimensions less than said predetermined dimensions, said first clamping element being disposed within said annular projection, said recess means being substantially annular for receiving said annular projection, and said second clamping element being disposed within said recess means.

9. An apparatus, as defined in claim 8, wherein said punch means comprises a member including said projection detachably secured to said first roll and a fastener securing said member to said first roll, a head portion of said fastener providing said first clamping element.

10. An apparatus, as defined in claim 8, wherein said second roll comprises a peripheral portion formed of tough resilient material, said recess means and said second clamping element being formed integrally with said peripheral portion.